Patented Apr. 28, 1942

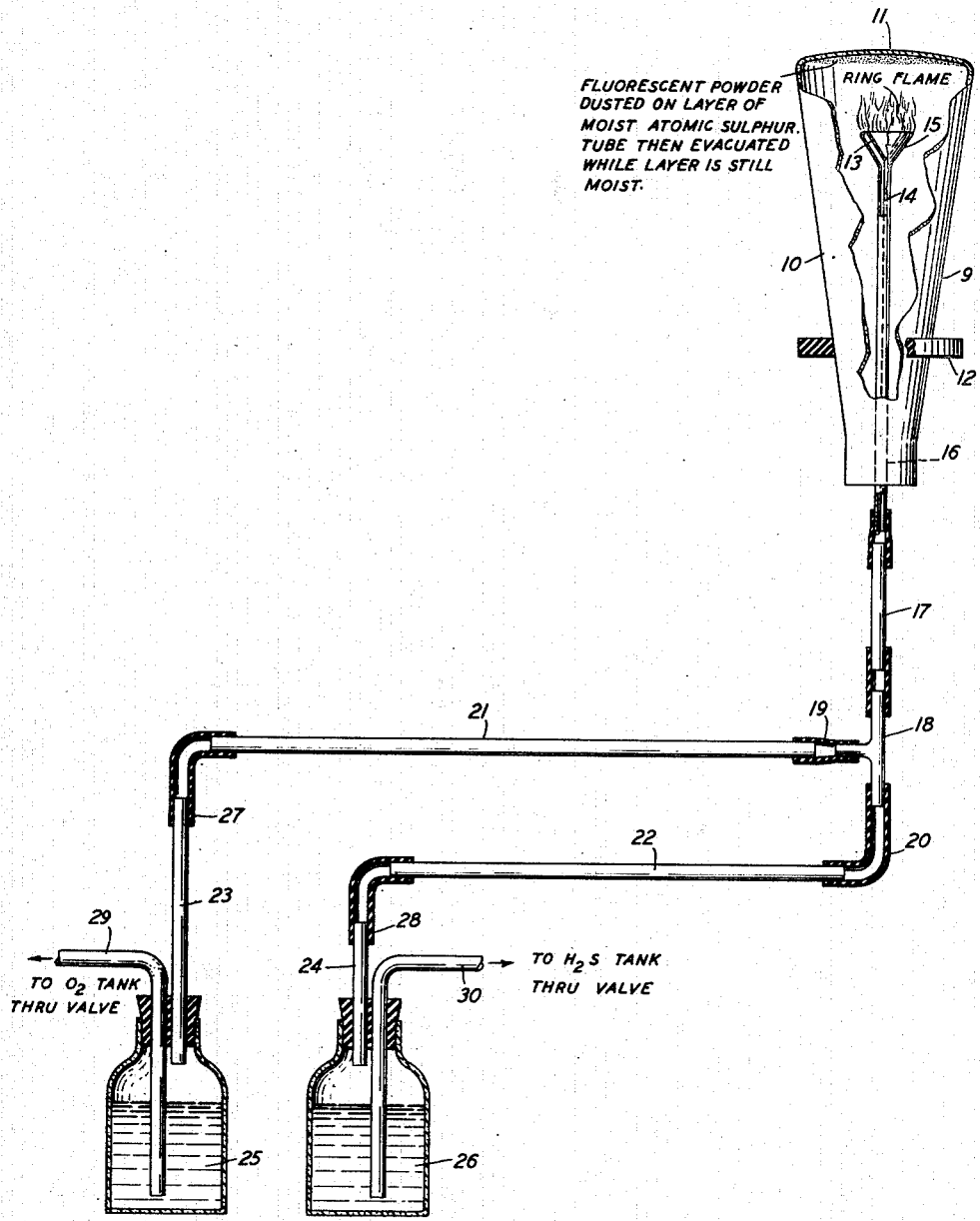

2,280,939

UNITED STATES PATENT OFFICE 2,280,939

LUMINESCENT SCREEN

Howard W. Weinhart, Elizabeth, N. J., assignor to Bell Telephone Laboratories, Incorporated, New York, N. Y., a corporation of New York Application April 5, 1940, Serial No. 327,959

5 Claims. (Cl. 91—70)

This invention relates to luminescent screens and more particularly to fluorescent screens and the method of coating these screens on supporting members.

It is an object of this invention to provide a fluorescent screen having a novel binder.

It is another object of this invention to provide a novel method of coating fluorescent screens on supporting surfaces by the use of sulphur as a binder.

In the manufacture of cathode ray tubes, it is frequently desired to use as a screen certain fluorescing powders, such as mixtures of zinc and cadmium sulphides activated with copper and manganese, this mixture producing a white luminescence. These powders lose their fluorescent efficiency when baked appreciably above 300° C. and since it is desired to coat, in the usual case, the conical walls of the cathode ray tube with a conducting coating for a final anode member, which coating is of any suitable material such as the product known to the trade as "aquadag" and which must be baked at 450° C. to remove volatile impurities, the fluorescent screen must be made after the conducting coating is baked on in order that the fluorescent efficiency of these powders be maintained. This means that the screen must be satisfactory the first time it is made since recoating a bulb which has an unsatisfactory screen requires thorough cleaning of the bulb interior, application and baking-on of the aquadag, and finally another coating of the fluorescent screen. With powders of this type the coating methods described in the prior art have been unsuccessful in producing satisfactory screens. The use of sulphur as a binding material is suggested in an article by Mr. W. H. Kohl published in the Canadian Journal of Research, A13, page 126, 1935. In the method described in this article, a glass surface to be coated is covered with sulphur "soot" (believed to be a mixture of molecular and atomic sulphur) by immersing the glass surface in a flame of burning carbon disulphide (CS$_2$). The fluorescent powder is then either dusted on to the sulphur covered surface to a desired thickness or shaken in bulk over the sulphur covered surface, the excess powder being finally poured off the surface. In the method described in the Kohl article the thickness of the final screen is determined by the density of sulphur "soot" deposited. The sulphur is then removed by evacuation either by baking in vacuum or in a gentle stream of flowing gas. The screen produced by this method is not as firmly inherent to the surface of the glass as desired.

In a process discovered by C. J. Calbick and J. B. Johnson and disclosed in a copending application, Serial No. 327,958, filed April 6, 1940, a thin film of sulphur (believed to be primarily atomic sulphur and given the name "haze" film) is produced on the end wall of a cathode ray tube or other supporting member by burning hydrogen sulphide and oxygen together in an inert atmosphere, the number of molecules of hydrogen sulphide (H$_2$S) in the mixture being at least equal to the number of molecules of oxygen (O$_2$) therein. After the thin film, consisting primarily of atomic sulphur, is formed, it is dried and fluorescent powder dusted on. The neck of the bulb is then sealed on and the whole bulb nitrogen baked. It may then be baked in vacuum after which the gun of the tube is sealed in and the tube pumped.

The present invention relates to an improvement in the Calbick-Johnson process briefly described above and it is, accordingly, a further object of this invention to provide a screen which is even more firmly adherent to the supporting member than are those produced by the Calbick-Johnson process.

The present invention is based upon the discovery that if the moist sulphur layer produced by burning hydrogen sulphide in oxygen as in the Calbick-Johnson process is allowed to remain in the wet state, fluorescent powder dusted on the film while it is still moist, the neck of the tube attached to the bulb and the tube evacuated while the screen is still moist, then a more firmly adherent screen is produced.

In order to better understand the present invention, the following equations should be considered. One reaction between H$_2$S and O$_2$ is

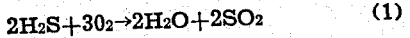

$$2H_2S + 3O_2 \rightarrow 2H_2O + 2SO_2 \quad (1)$$

The reaction between sulphur dioxide and additional H$_2$S may be written as follows:

$$4H_2S + 2SO_2 \rightarrow 4H_2O + 6S \quad (2)$$

Equation 2 is the so-called Peachey reaction (named for its discoverer in the process of vulcanization of rubber). If equations 1 and 2 are added together it can be seen that

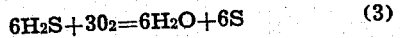

$$6H_2S + 3O_2 = 6H_2O + 6S \quad (3)$$

This seems to indicate that the mixture to be burned should consist of two parts of H$_2$S plus one part of O$_2$. Actually, it is very difficult to get a mixture so deficient in oxygen to burn in a nitrogen atmosphere (the atmosphere generally used). On the other hand, a mixture rich enough, such as two parts of H$_2$S to three parts of O$_2$ produces the reaction represented by Equation 1 and virtually no atomic sulphur. The film deposited on the glass by this reaction is very watery, undoubtedly being mostly sulphurous acid (H$_2$SO$_3$). It is impossible to produce a good screen by dusting fluorescent powder on such a film. Best results are obtained when the oxygen in the mixture is reduced to a point where it will just burn in a nitrogen atmosphere and in this condition the flame is long, flickering and bluish.

It can be seen from the above equations that atomic sulphur and water are produced by the burning of hydrogen sulphide and oxygen together, although it can hardly be said that the wet film is really a mixture of just water and atomic sulphur, as in the reaction $SO_2$, which is highly soluble in water, is formed. Also some unburned $H_2S$ may be present.

Close packing is the primary reason for adherence. It should be pointed out first that it is possible to make a screen by settling the fluorescent powder out of a liquid suspension, and no binder is used in this process. Particles adhere to the glass and to each other simply because of surface adhesion. To make a practical screen by this method it is necessary that the particles have opportunity in the process employed to orient themselves so that relatively large surface areas of each particle are in close proximity to similar large surface areas of the glass or of other particles which in their turn are firmly adherent to the glass by the operation of surface forces. The result is what may be called a close packed layer of fluorescent particles. In the settling method, the close packing is the result of gravitational and surface adhesion forces acting upon the particles while they are lubricated by the liquid in which the particles have been suspended. In the absence of the liquid, as, for example, in the process of simply dusting the powder on a glass surface, the lack of lubrication prevents the formation of a close packed layer, and the resulting screen is only imperfectly adherent. In the sulphur method employed by Calbick and Johnson, the atomic sulphur is believed to form a sort of carpet into which the fluorescent particles fall. These particles are very firmly attached to the sulphur because atomic sulphur exerts unusually large surface adhesion forces on other materials and hence is very firmly adherent both to the glass and to the particles. An extension of the above theory explains why more adherent screens are produced if the original sulphur layer is left wet. In the reaction used in the Calbick-Johnson process it must be recalled that an excess of water is formed in the vapor phase; this water vapor condenses upon the atomic sulphur carpet at all stages of its formation; water adheres to the atomic sulphur strongly so that the "carpet" is really an intimate mixture of atomic sulphur and water carrying in solution $H_2S$ and $SO_2$. The surface adhesion forces being very large, the wet sulphur layer is by no means a liquid layer. As an analogy, for example, the presence of water of crystallization in a crystal chemical compound does not make the compound liquid.

The fluorescent powder is now dusted on the wet sulphur "carpet" and the operation of rather complex surface forces causes it to stick very well. Because of the more favorable distribution attained in the liquid phase, the particles are believed to be more closely packed than in the dry process; and because of the greater mobility of the atomic sulphur in the liquid phase, the binder action of the final atomic sulphur layer as assumed on each particle is believed to be more complete.

In one form of apparatus for forming the binding layer of this invention, a cathode ray bulb is supported by any suitable means and a burner which gives a ring-shaped flame is placed inside the tube. Pipes leading to supplies of oxygen $(O_2)$ and hydrogen sulphide $(H_2S)$ are connected to the burner valve to produce the correct proportion of these two, and the resultant mixture is supplied to the burner. The burning takes place in an atmosphere of nitrogen or other suitable inert gas, such as argon, neon or helium. The oxygen $(O_2)$ and the $H_2S$ are preferably bubbled through water before they pass into the burner.

The invention will be more readily understood by referring to the following description taken in connection with the accompanying drawing forming a part thereof in which the single figure shows apparatus suitable for forming the binding layer of this invention, although it is to be understood that any other appropriate apparatus may be used as well.

Referring more particularly to the drawing, the single figure shows, by way of example, a form of apparatus for carrying out certain of the steps of the method of this invention. In the apparatus shown in this figure, a cathode ray tube 9 having a conducting coating 10 on the side walls thereof has an end wall 11 to which is to be applied a fluorescent screen by the method of this invention. Due to the fact that the fluorescent screen must be baked at a temperature not exceeding approximately 300° C. and because a suitable conducting coating requires a temperature for baking of about 450° C., the coating is placed within the tube before the fluorescent screen is affixed thereto. The conducting coating may be applied to the walls of the tube by well-known means.

Tube 9 is supported by any suitable means, such as by a ring band 12 which is preferably mounted in a hood (not shown) equipped with proper means for the removal of obnoxious gases.

The first step in the preparation of the fluorescent screen on the end wall 11 of the tube 9 is to form a binding layer consisting primarily of atomic sulphur. In accordance with this invention this binding layer is formed by burning a mixture of hydrogen sulphide $(H_2S)$ and oxygen $(O_2)$ in an inert atmosphere, such as, for example, nitrogen, argon, helium or neon. Because of its ready availability nitrogen is preferred. While the inert gas is not necessary, it is hard to get a controlled flame without it and its use is therefore preferred in the process in accordance with this invention.

The two gases ($O_2$ and $H_2S$) are supplied from their sources (not shown) through a suitable piping system, to be described more fully below, to a burner which produces a ring-shaped flame. This burner preferably comprises a cone 13 of any suitable high melting point glass such as the product known to the trade as "Pyrex" glass. A wire 14 of any suitable material, such as platinum, is sealed into its vertex to support it in position within a larger cone 15 of high melting point glass which is sealed near its vertex to a glass tubing 16. The wire 14 passes through the tubing 16 and is hooked around the lower end thereof, being fastened between the tubing 16 and the rubber tubing connecting the tubing 16 to the tubing 17. The combination of the two cones 13 and 15 of high melting point glass and the tube 16 forms a burner which yields a ring flame as indicated in the drawing. Obviously, any other suitable burner may be used as well. Connected to the tube 17 and joined thereto by any suitable means, such as by the T-shaped member 18 of glass and by the rubber tubes 19 and 20, are the two tubes 21 and 22, preferably of glass, which are connected through tubes 23 and 24 to the bottles 25 and 26 containing water.

Rubber tubing 27 and 28 may be used to connect the tubes 21 and 22 to the tubes 23 and 24, respectively. Tubes 29 and 30 leading through valves (not shown) to tanks (not shown) of oxygen and hydrogen sulphide ($H_2S$) also project into the bottles 25 and 26. By this means the gas is allowed to bubble through the water so that by comparing the rate of bubbling the relative amounts of $O_2$ and $H_2S$ in the resultant mixture may be observed and controlled.

The operation of the apparatus shown in the drawing to produce a fluorescent screen by the method of this invention is as follows: With the burner formed by the members 13, 14, 15 and 16 outside the flask or bulb 9 the $H_2S$ is turned on and the gas escaping between the cones 13 and 15 ignited to produce a ring-shaped flame. The oxygen ($O_2$) is then turned on and valved so that its rate of bubbling through the water bottle 25 is about one-half that of the rate of bubbling of the $H_2S$ through its water bottle 26. This produces a fairly hot blue flame burning in air. The burner is then inserted in the tube or flask 9 which has been previously filled with nitrogen or any other suitable inert gas. The flame changes its character, becoming larger and less hot. Since the oxygen present is not large compared to the amount of $H_2S$, the flame will be extinguished. The correct adjustment gives just sufficient oxygen for combustion to continue in a nitrogen or other inert gas atmosphere. By Equation 3 above, the proper mixture to be burned consists of two parts of $H_2S$ to one part of $O_2$. Actually, it is difficult to get a mixture so deficient in oxygen to burn in a nitrogen atmosphere. On the other hand, a mixture rich in oxygen, such as two parts of $H_2S$ to three parts of $O_2$ produces the reaction shown by Equation 1 above and virtually no atomic sulphur. The film deposited on the glass by the latter reaction is thin and watery and also invariably mostly sulphurous acid ($H_2SO_3$). It is impossible to produce a good screen by dusting fluorescent powder on such a film. The best results are obtained when the oxygen in the mixture is reduced to a point where it will just burn in a nitrogen or other inert gas atmosphere. In this condition the flame is long, flickering and bluish. As the oxygen content is increased, the flame becomes short, intense and yellowish, the color presumably being due to sodium from the glass of the burner. When using the apparatus described above, it is very easy experimentally to adjust the flame to the correct condition. Fairly good films of atomic sulphur are obtained with mixtures such as three parts $H_2S$ and two parts of $O_2$, but poor films result if the number of parts of $O_2$ is allowed to exceed the number of parts of $H_2S$ (all parts are by volume). In general, it can be stated that the ratio of the number of molecules of $H_2S$ to the number of molecules of $O_2$ should be between 1 to 1 and 2 to 1.

The burner is given a rotary motion by any suitable means, such as by hand, on the inside of the flask 9 in order to distribute the "haze" film of atomic sulphur more evenly upon the inside surface of the end wall 11 of the flask 9. The top of the flame is preferably kept fixed at from six to eight inches below the end 11 of the tube 9. Combustion is allowed to proceed for a period of about fifteen to thirty seconds depending on the size of the flask and the size of the flame. The flame is extinguished by shutting off the oxygen supply and finally the $H_2S$ is shut off.

At this point in the Calbick-Johnson process the flask is thoroughly flushed out with nitrogen before removal from the hood in order to dry the thin film of atomic sulphur. In the process according to the present invention, however, the atomic sulphur film which is moist is allowed to remain in that condition, and the fluorescent powder dusted on the film while it is still moist. This may be done immediately or after the flask has had time to cool (although not long enough to dry the atomic sulphur binding layer). A suitable fluorescent powder is that known to the trade as No. 60 powder manufactured by the Patterson Screen Company. This powder is essentially Zn—CdS activated with silver, copper and manganese. Other suitable fluorescent powders are calcium tungstate or synthetic willemite.

The neck (not shown) of the tube is then sealed onto the flask 9 and the bulb is then evacuated for about three hours while the screen is still moist. The tube is then baked in an oven in vacuum at about 300° C. which produces a strongly adherent fluorescent screen. The electron gun is then sealed into the tube and it is then pumped to the required degree of vacuum.

The screens obtained by this method will stand greater mechanical shock than those made by the method suggested in the Kohl article and briefly described above or by those made by the Calbick-Johnson process. The method suggested in the Kohl article was reproduced and it was found that a screen obtained by such method will not stand the technique of rotating the tube on a lathe in the process of sealing the neck of the tube to the bulb thereof. The screen formed by the method of this invention also does not have the disadvantage of the well-known silicate binder (the silicate dries off so fast that mechanical adhesion when dusting on the fluorescent screen is irregular). While glycerine may be used in combination with the silicate binder it has been found that when the glycerine is baked there is a reducing action and areas of non-uniform fluorescence are produced.

Close packing is the primary reason for adherence. In the settling method of forming a fluorescent screen, the close packing is the result of gravitational surface adhesion forces acting upon the particles while they are lubricated by the liquid in which the particles have been suspended. In the absence of the liquid, as, for example, when the powder is simply dusted on a glass surface, the lack of lubrication prevents the formation of a close packed layer, and the resulting screen is only imperfectly adherent. In the sulphur method, the atomic sulphur forms a sort of "carpet" into which the fluorescent particles fall. These particles are very firmly attached to the sulphur because atomic sulphur exerts unusually large surface adhesion forces on other materials, and hence is very firmly adherent both to the glass and to the particles. When now the screen is baked, the atomic sulphur liquefies (at a temperature of 122° C.) and redistributes itself so that each of the particles probably becomes covered with a film of atomic sulphur. At the same time the atomic sulphur is probably recombining to form molecular sulphur in the interstices between the particles. Since there is only a limited supply of sulphur, this last process may use up all the sulphur before all the particles are completely covered with the film of atomic sulphur. As the temperature is further raised, the sulphur begins to evaporate, probably first from the interstices where molecular sulphur has been formed. The sulphur in these regions being liquid, particles are lubricated and orient themselves under the action of surface (and possibly gravitational) forces until, as the sulphur finally completely evaporates, a closely packed layer of particles is formed. It is highly probable that the last layer of atomic sulphur adhering to each particle is so firmly adherent that it cannot be evaporated except at temperatures much higher than those used in baking. Such layers probably act in some degree as a binder to hold the particles even more firmly than would be the case with simple close packing. An extension of this theory explains why more adherent screens are produced if the original sulphur layer is left wet. In the reaction used in the process in accordance with this invention, it must be remembered that an excess of water is formed in the vapor phase; this water vapor condenses upon the atomic sulphur carpet at all phases of its formation; the water adheres to the atomic sulphur strongly, so that the "carpet" is really an intimate mixture of water and atomic sulphur. The surface adhesion forces being very large, the wet sulphur layer is by no means a liquid layer. As an analogy, for example, the presence of water of crystallization in a crystalline chemical compound does not make the compound liquid. The fluorescent powder is now dusted on the wet sulphur carpet and the operation of rather complex surface forces causes it to stick very well. When baking begins, however, the water evaporates first and redistribution of the atomic sulphur occurs at a much lower temperature than in the dry process. Here again the liquefaction of rather low temperature of crystalline chemical compounds containing water of crystallization might furnish a useful analogy. Thus the wet sulphur "carpet" assumes liquid characteristics (that is, it "melts") at a temperature of the order of perhaps 50° C. In this phase, each particle becomes completely covered with atomic sulphur, by the operation of sulphur forces, and, moreover, the particles can assume the most favorable distribution over the surface. (Movement of each particle must be considered as limited to a few thousandths of a millimeter.) As the temperature is further raised the water evaporates, probably taking with it some of the sulphur, which has an appreciable water vapor pressure even at 100° C. From this point on the process is the same as in the Calbick-Johnson method. First the sulphur liquefies, then evaporates and as this occurs, surface forces result in a final close packed arrangement. Because of the more favorable distribution attained in the liquid phase between 50° C. and 100° C. the particles are believed to be more closely packed than in the dry process; and because of the greater mobility of the atomic sulphur in the mentioned-above liquid phase, the binder action of the final atomic sulphur layer assumed on each particle is more complete. (Each particle has a greater chance of being completely covered.) The foregoing explanation of the process explains why the sulphur method prevents degradation of the fluorescence during baking. This degradation is a reduction chemical reaction, caused by the breakdown of the zinc and cadmium sulphides composing the fluorescent material. This reduction removes sulphur and leaves metallic zinc and cadmium which injuriously affect the fluorescent properties. In the sulphur method each particle is surrounded by a layer of a sulphur, which has the effect of preventing the liberation of metallic zinc and cadmium.

In comparing the wet and dry sulphur film methods, it should be pointed out that a wet film is always formed; the difference between the methods consists in whether or not this film is dried out (by a current of dry nitrogen or other dry gas) prior to the dusting on of the fluorescent powder. The dry method was developed first but it has been discovered that the wet method produces more firmly adherent fluorescent screens.

After the completed screen has been formed it is believed to consist primarily of the fluorescent powders themselves although there may be sulphur of the order of one molecule thick, which constitutes a binding layer because of close adherence between the fluorescent powder and the glass end wall 11 of the tube 9.

Obviously modifications may be made in the apparatus for carrying out the method of this invention without materially affecting the results. The time and temperatures stated above are not very critical and they may be varied somewhat from the values given above.

What is claimed is:

1. A method of binding fluorescent material to a supporting member comprising the steps of burning a mixture of hydrogen sulphide and oxygen to produce a thin film of sulphur on the supporting member for said fluorescent layer, said burning also producing water, and applying fluorescent powder to the film while it is still moist.

2. A method of binding flourescent material to a supporting member comprising the steps of burning a mixture of hydrogen sulphide and oxygen to produce a thin film of sulphur on the supporting member for said fluorescent layer, said burning also producing water, applying fluorescent powder to the film while it is still moist, and then baking the tube while the screen is still moist.

3. The method of producing a fluorescent screen on the end wall of a cathode ray tube comprising the steps of burning within the tube hydrogen sulphide and oxygen to produce thereby on the end wall of the tube a film of sulphur particles and water, applying fluorescent powder to the film while it is still moist, and evacuating the tube while the screen is still moist.

4. The method of producing a fluorescent screen on the end wall of a cathode ray tube comprising the steps of burning hydrogen sulphide and oxygen together to produce thereby on the end wall of the tube a film of sulphur particles and water, applying fluorescent powder to the film while it is still moist, attaching a neck to the tube, evacuating the tube while the screen is still moist, and then baking the tube in vacuum.

5. A fluorescent screen for a supporting member comprising a thin binder layer of sulphur produced by burning hydrogen sulphide and oxygen together, and fluorescent powder bound to said supporting member by said binding layer by being dusted on said layer while it was still moist, said moisture being produced by the burning together of the hydrogen sulphide and oxygen.

HOWARD W. WEINHART.